(12) United States Patent (10) Patent No.: US 12,443,504 B2
Liu et al. (45) Date of Patent: Oct. 14, 2025

(54) FILTERING MEASUREMENT DATA FROM AN ELECTRONIC CONTROL UNIT (ECU) OF A VEHICLE

(71) Applicant: SHANGHAI TOSUN TECHNOLOGY LTD., Shanghai (CN)

(72) Inventors: Chu Liu, Shanghai (CN); Yueyin Xie, Shanghai (CN); Mang Mo, Shanghai (CN)

(73) Assignee: SHANGHAI TOSUN TECHNOLOGY LTD., Shanghai (CN)

( * ) Notice: Subject to any disclaimer, the term of this patent is extended or adjusted under 35 U.S.C. 154(b) by 0 days.

(21) Appl. No.: 18/512,162

(22) Filed: Nov. 17, 2023

(65) Prior Publication Data

US 2025/0165369 A1 May 22, 2025

(51) Int. Cl.
 G06F 11/30 (2006.01)
 G06F 11/32 (2006.01)
 G06F 11/362 (2025.01)

(52) U.S. Cl.
 CPC ........ G06F 11/3075 (2013.01); G06F 11/324 (2013.01); G06F 11/3656 (2013.01)

(58) Field of Classification Search
 None
 See application file for complete search history.

(56) References Cited

U.S. PATENT DOCUMENTS 5,850,523 A 12/1998 Gretta, Jr.
6,311,265 B1 * 10/2001 Beckerle ................. G06F 8/314
 712/203

(Continued)

FOREIGN PATENT DOCUMENTS

CN 101739026 A 6/2010
CN 108809741 A 11/2018
(Continued)

OTHER PUBLICATIONS

Shanghai Tosun Technology Ltd., TSMaster User Manual, pp. 1-205.

(Continued)

*Primary Examiner* — Qing Chen
(74) *Attorney, Agent, or Firm* — Bayramoglu Law Offices LLC

(57) ABSTRACT

A system for filtering measurement data, comprising: a bus adapter, configured to obtain a data source from an Electronic Control Unit (ECU); at least one computer device, comprising a processor, a display communicating with the processor to present a graphical interface, a readable storage medium, a communication bus and communication interface; wherein, the processor, the readable storage medium and the communication interface communicate with the bus adapter via the communication bus; the readable storage medium is configured to store instructions; the processor is configured to, after obtaining the data source, execute the instructions to perform the operations: setting an upstream data flow input port, a downstream data flow output port and a filtering function for each measurement window; connecting the upstream data flow input port of each measurement window to the downstream data flow output port of one measurement window other than the measurement window to form a hierarchical connection.

20 Claims, 10 Drawing Sheets

(56) References Cited

U.S. PATENT DOCUMENTS

| | | | |
|---|---|---|---|
| 2003/0065432 A1 | 4/2003 | Shuman et al. | |
| 2005/0097561 A1* | 5/2005 | Schumacher | G06F 8/10 |
| | | | 712/213 |
| 2013/0313325 A1* | 11/2013 | Wilz, Sr. | G06K 7/10821 |
| | | | 235/462.25 |
| 2013/0339923 A1* | 12/2013 | Xu | G06F 8/433 |
| | | | 717/104 |
| 2017/0300321 A1 | 10/2017 | Staeubli et al. | |
| 2019/0182074 A1 | 6/2019 | Muth et al. | |

FOREIGN PATENT DOCUMENTS

| | | |
|---|---|---|
| CN | 110737578 A | 1/2020 |
| CN | 111901349 A | 11/2020 |
| CN | 112378420 A | 2/2021 |
| CN | 114238825 A | 3/2022 |
| CN | 115567340 A | 1/2023 |
| EP | 1615141 A2 | 1/2006 |
| JP | 2005352618 A | 12/2005 |
| JP | 2006201988 A | 8/2006 |
| JP | 2007325251 A | 12/2007 |
| JP | 2010282291 A | 12/2010 |
| RU | 2753500 C1 | 8/2021 |
| WO | 2010138412 A1 | 12/2010 |

OTHER PUBLICATIONS

Shanghai Tosun Technology Ltd., Comparison and Use of Several TSMaster Filters, 2023, pp. 1-7.
Jinsheng Yang, et al., CANoe Development from Entry to Mastery, 2019, pp. 46-70.

* cited by examiner

FILTERING MEASUREMENT DATA FROM AN ELECTRONIC CONTROL UNIT (ECU) OF A VEHICLE

TECHNICAL FIELD

The present disclosure relates to the field of data filtering technologies and in particular to a method and a system for implementing a measurement data filter, a storage medium and an electronic device.

BACKGROUND

In a conventional hardware-in-loop simulation scenario, in order to perform test on a specific Electronic Control Unit (ECU), for example, on ABS algorithm, it is usually required to activate multiple CAN buses connected to the ABS module at the same time. These buses have a high load rate, and thus each measurement window in a vehicle bus tool software has to face the challenge of high CPU load just because each window needs to process all packets received by the CAN buses.

SUMMARY

The present disclosure provide a system for filtering measurement data, comprising:
- at least one bus adapter, configured to obtain a data source from an Electronic Control Unit (ECU);
- at least one computer device, comprising a processor, a display communicating with the processor to present a graphical interface, a readable storage medium, a communication bus and a communication interface; wherein,
- the processor, the readable storage medium and the communication interface communicate with the bus adapter via the communication bus;
- the readable storage medium is configured to store instruction programs;
- the processor is configured to, after obtaining the data source, execute the instructions to perform the operations of: setting an upstream data flow input port, a downstream data flow output port and a filtering function for each measurement window; connecting the hand upstream data flow input port of each measurement window to the downstream data flow output port of one measurement window other than the measurement window or a data source to form a hierarchical connection; receiving, by each layer of measurement window, data from an upper-layer measurement window via the upstream data flow input port of this layer of measurement window and filtering the received data and then transporting the data to a lower-layer measurement window via the downstream data flow output port of this layer of measurement window;
- the display displays, through a graphical interface, a data source window and/or at least one measurement window connected with the data source window.

The summary of the present disclosure aims to provide brief descriptions for the subjects of the specification. Thus, it should be understood that the above features are only illustrative and shall not be interpreted as narrowing the scope or essence of the subject of the specification in any way.

Other features, aspects and advantages of the subjects of the present disclosure will become apparent by way of the specific embodiments, drawings and claims.

BRIEF DESCRIPTION OF DRAWINGS

In order to more clearly describe the technical solutions in the specific embodiments of the present disclosure and in the prior arts, the drawings required for descriptions of the specific embodiments or the prior arts will be briefly introduced below. Apparently, the drawings described herein are merely some embodiments of the present disclosure. Those skilled in the arts can obtain other drawings based on these drawings without making creative work.

DETAILED DESCRIPTION OF THE EMBODIMENTS

Figure 1:
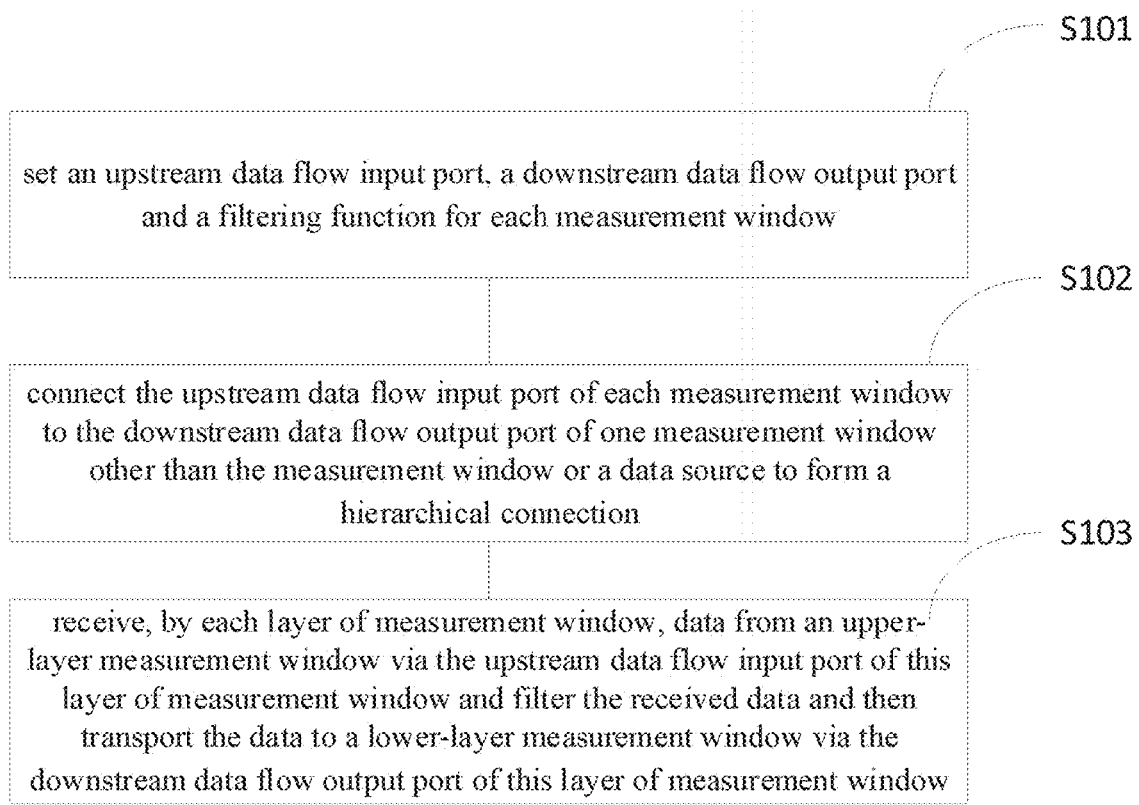
FIG. 1 is a step diagram illustrating a method of implementing a measurement data filter according to some embodiments of the present disclosure.

In order to make the object, technical solutions and advantages of the embodiments of the present disclosure clearer, the technical solutions of the present disclosure will be fully and clearly described in combination with drawings. Apparently, the embodiments described herein are only some embodiments rather than all embodiments. All other embodiments obtained by those skilled in the art based on these drawings without making creative work shall fall within the scope of protection of the present disclosure.

In a conventional hardware-in-loop simulation scenario, in order to perform test on a specific Electronic Control Unit (ECU), for example, on ABS algorithm, it is usually required to activate multiple CAN buses connected to the ABS module at the same time. These buses have a high load rate, and thus each measurement window in a vehicle bus tool software has to face the challenge of high CPU load just because each window needs to process all packets received by the CAN buses.

After a user adds a conventional filter to a graphical window A and configures a filtering condition of signals to be observed for the ABS module, if it is required to re-observe some signals (e.g. four wheel speed signals) in the signals already observed for the ABS module in the graphical window A, in a measurement window, for example, another graphical window B or a numerical window, or a panel window or a signal value window or the like, it is required to add the conventional filter again to each measurement window to be observed and configure relevant data filtering conditions. Since the data filtering conditions are not identical to the data filtering conditions of the graphical window A, the repeated configuration work will be time-consuming and labor-consuming, and may easily generate errors, affecting the test process.

As a result, at least one embodiment provides a method of implementing a measurement data filter, including: setting an upstream data flow input port, a downstream data flow output port and a filtering function for each measurement window;

connecting the upstream data flow input port of each measurement window to the downstream data flow output port of one measurement window other than the measurement window or a data source to form a hierarchical connection;

receiving, by each layer of measurement window, data from an upper-layer measurement window via the upstream data flow input port of this layer of measurement window and filtering the received data and then transporting the data to a lower-layer measurement window via the downstream data flow output port of this layer of measurement window.

Compared with the conventional filter performing single filtering function, in the filter designed in the embodiments of the present disclosure, each measurement window is equivalent to one filter unit and a hierarchical connection is formed among various measurement windows, and further, each measurement window may be connected to a plurality of lower-layer measurement windows. The hierarchical connection can enable a filtering result of a current measurement window to be transferred to a lower layer, such that it is not required to, like the conventional filters, repetitively set a filtering function before a plurality of measurement windows needing a same filtering result respectively. Further, level-by-level filtering can be achieved without additionally setting a dedicated filter between various layers of measurement windows, so as to accomplish complex data processing and data test with fewest configurations, thus reducing the CPU consumption of the vehicle bus tool software.

Various non-limiting implementations of the embodiments of the present disclosure will be detailed below in combination with drawings.

As shown in FIG. 1, one or more embodiments provide a method of implementing a measurement data filter. The method includes the following steps.

At step S101, an upstream data flow input port, a downstream data flow output port and a filtering function are set for each measurement window.

At step S102, the upstream data flow input port of each measurement window is connected to the downstream data flow output port of one measurement window other than the measurement window or a data source to form a hierarchical connection.

At step S103, each layer of measurement window receives data from an upper-layer measurement window via the upstream data flow input port of this layer of measurement window and filters the received data and then transports the data to a lower-layer measurement window via the downstream data flow output port of this layer of measurement window.

Specifically, the measurement window refers to a window of measurement bus data which includes various types of display modes, for example, a graphical display, and a text display. The graphical display includes but not limited to a graphical window and a monitored signal curve and the like; the text display includes but not limited to a packet information window and a change process of a monitored signal value and the like.

In some embodiments, each measurement window is in dynamic hierarchical connection with other measurement windows, and capable of adjusting a connection relationship with other measurement windows or data source, so as to obtain the corresponding desired data by filtering based on different use requirements. Further, the dynamic connection can enable quick switching of an upper-layer connection of one measurement window, such that the filtering result of the measurement window can be quickly switched so as to improve the configuration efficiency of the filter and the modification efficiency of the filtering result.

Descriptions will be made below on how to form a dynamic hierarchical connection among various measurement windows in combination with case and drawings.

Figure 2:
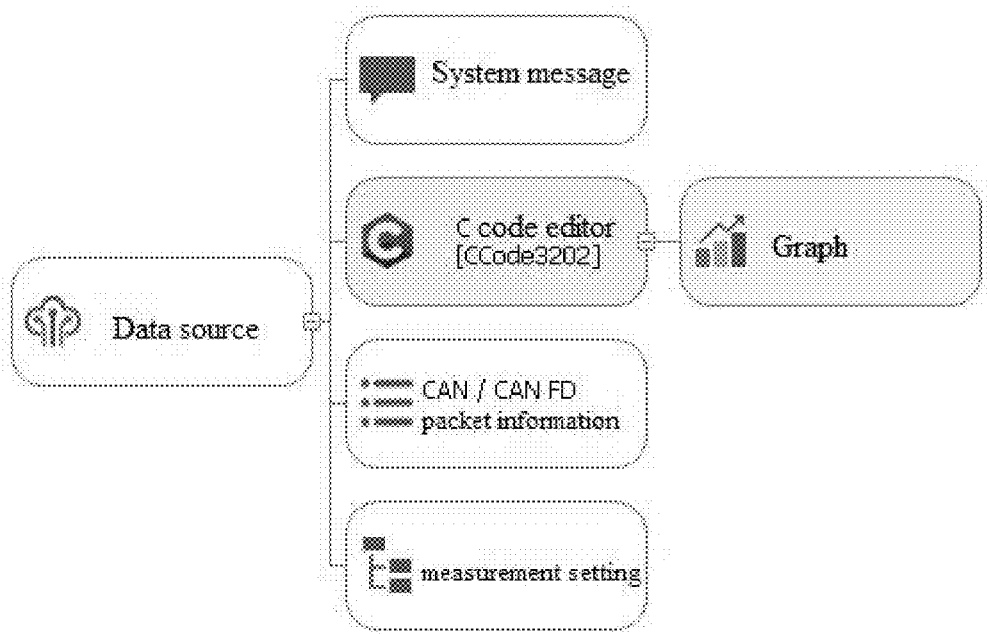
FIG. 2 is a schematic diagram illustrating a case of forming a dynamic hierarchical connection among various measurement windows according to some embodiments of the present disclosure.

As shown in FIG. 2, in a measurement setting window of the measurement data filter, the data source is a data source of all filters of each layer, and a C code editor is connected to the data source are located at a first layer level; the graphical window is connected to a C code editor and located at a second layer level.

Figure 3:
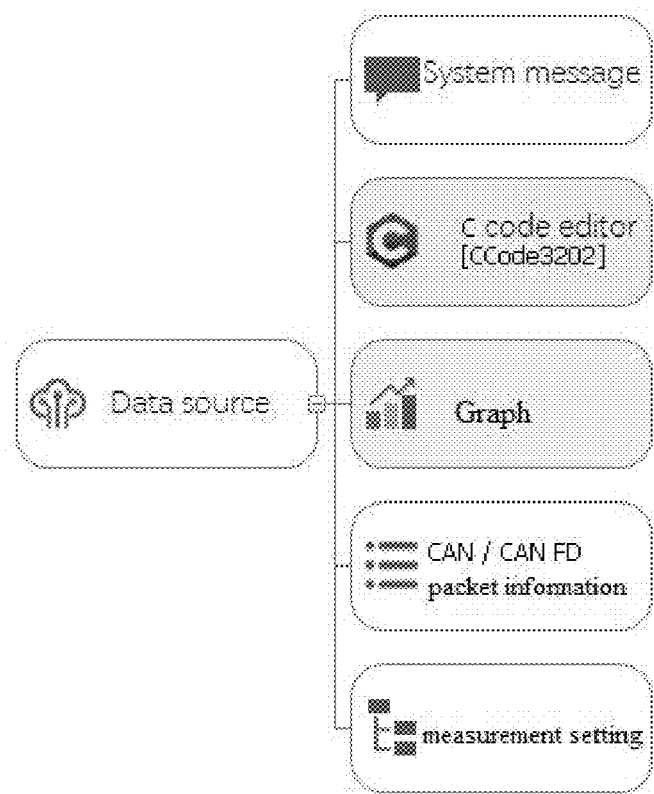
FIG. 3 is a schematic diagram illustrating a case of forming a dynamic hierarchical connection among various measurement windows according to some embodiments of the present disclosure.

As shown in FIG. 3, the graphical window in FIG. 2 can be dynamically dragged and connected to the data source to enable the graphical window to be located at the same layer level as the C code editor.

Figure 4:
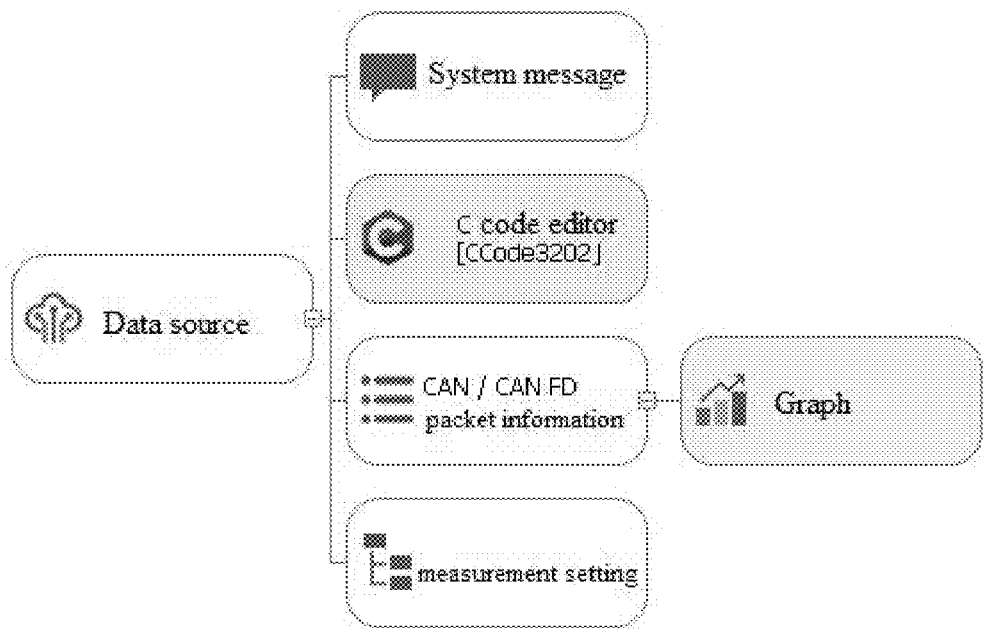
FIG. 4 is a schematic diagram illustrating a case of forming a dynamic hierarchical connection among various measurement windows according to some embodiments of the present disclosure.

As shown in FIG. 4, the graphical window in FIG. 2 can be dynamically dragged and connected to a CAN/CAN FD packet information window to enable the graphical window to be still at the second layer level but receive signals filtered by the CAN/CAN FD packet information window.

Descriptions will be made below on how to form a dynamic hierarchical connection among various measurement windows in combination with case and drawings.

Figures 5, 6:
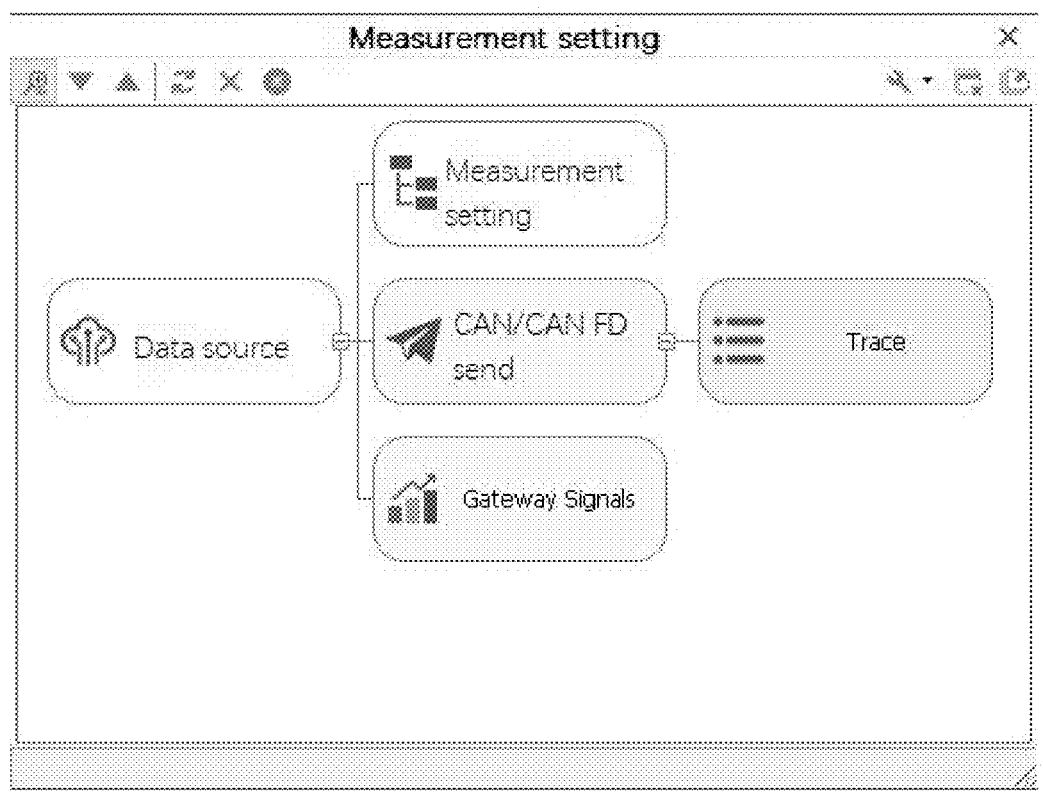
FIG. 5 is a schematic diagram illustrating a window "CAN/CAN FD sending" according to some embodiments of the present disclosure.
FIG. 6 is a schematic diagram illustrating an application case of forming a dynamic hierarchical connection among various measurement windows according to some embodiments of the present disclosure.

As shown in FIG. 5, in a vehicle test, engine-related packets are automatically sent via the "CAN/CAN FD sending" window, where there are a total of three frames of packets, the identifiers of which are 0x064, 0x110 and 0x111 respectively.

As show in FIG. 6, in use, the user hopes to open a Trace window to display packet information and view three frames of packet information sent by the user while filtering out other packets, for example, the packets sent by the vehicle ECU. At this time, it is only required to establish a new Trace window and drag the Trace window to the right side of the window "CAN/CAN FD sending" to serve as a lower-layer measurement window in a measurement setting window of the measurement data filter. At this time, three frames of packet information in the window "CAN/CAN FD sending" automatically become a filtering condition of the Trace window. In this method, it is not required to configure a filter for the Trace window, greatly improving the configuration efficiency of the filter.

Figure 7:
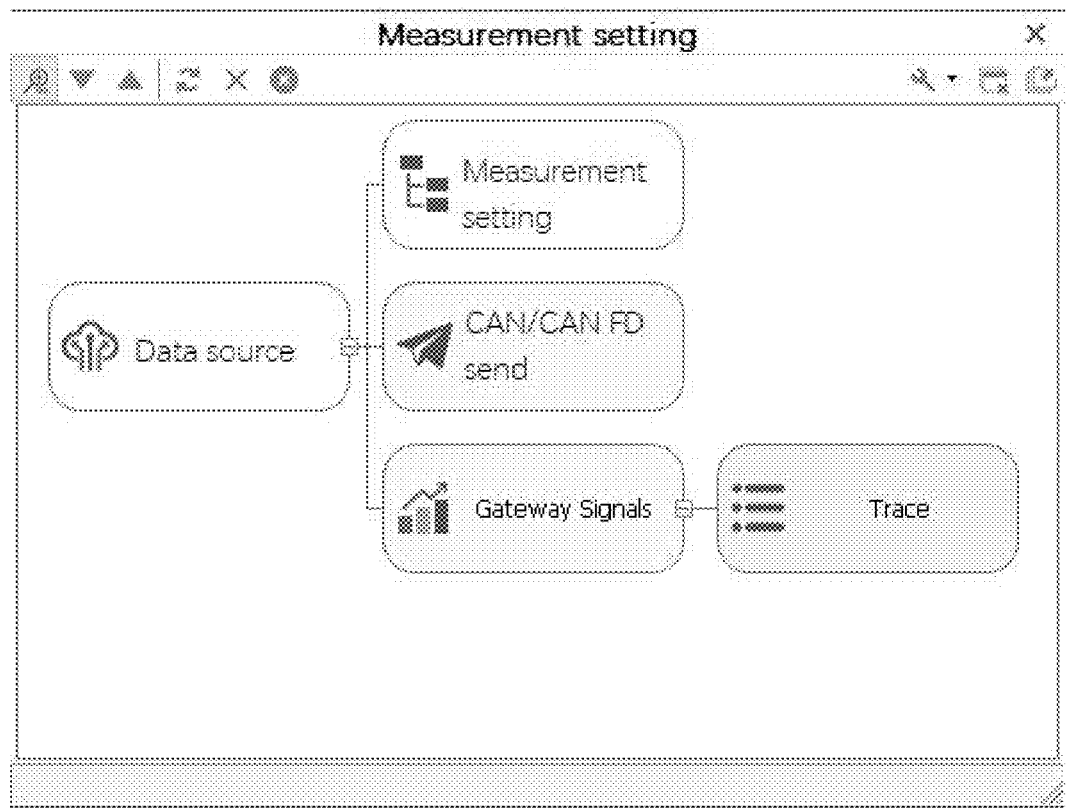
FIG. 7 is a schematic diagram illustrating an application case of forming a dynamic hierarchical connection among various measurement windows according to some embodiments of the present disclosure.

As shown in FIG. 7, in use, the user further hopes to view packet information corresponding to gateway signals while filtering out other irrelevant information. In a software system, there is already a gateway signal curve graph window "Gateway Signals", and at this time, it is only required to drag the Trace window to the right side of the curve graph window "Gateway Signals" in the measurement setting window of the measurement data filter, so as to meet the user requirements. In this case, it is not required to design any filter for the Trace window.

Figure 8:
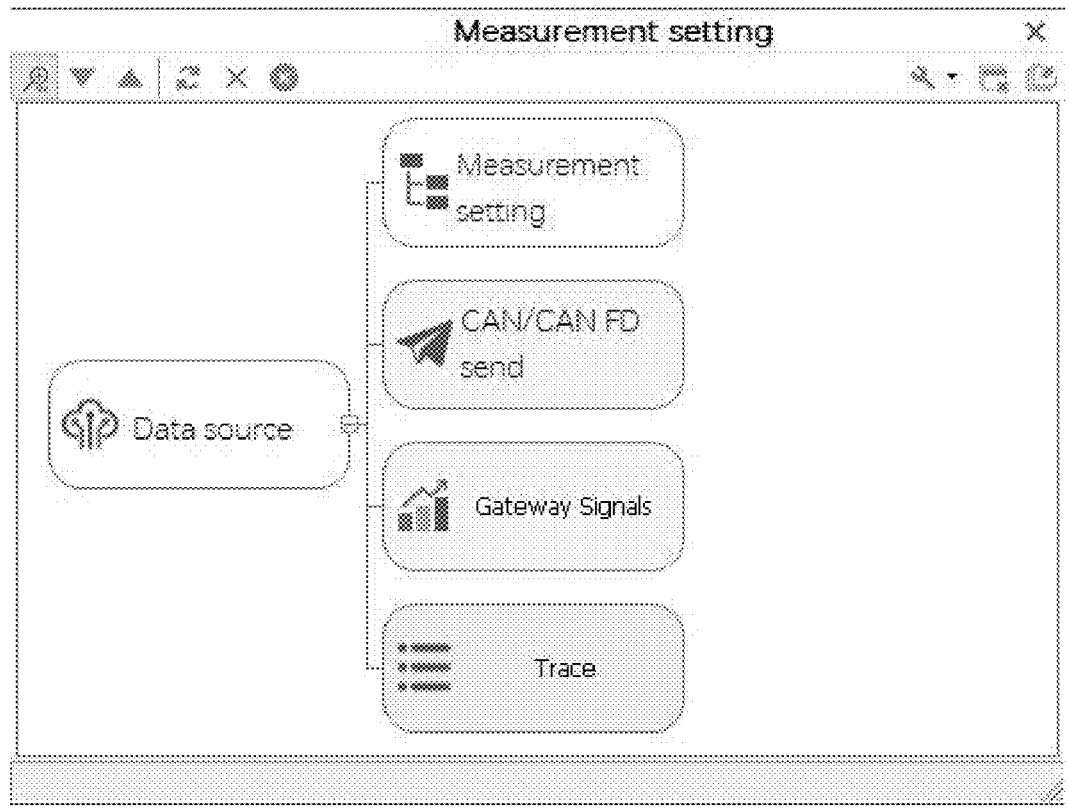
FIG. 8 is a schematic diagram illustrating an application case of forming a dynamic hierarchical connection among various measurement windows according to some embodiments of the present disclosure.

As shown in FIG. 8, in use, if the user further hopes to view all packet information, the user does not hope to filter out any bus packets but in the measurement setting window of the measurement data filter, drag the Trace window to the right side of the "data source", that is, to a position in parallel with the window "CAN/CAN FD sending" and the window "Gateway Signals", so as to meet the user requirements. In this case, it is not required to clear any filter for the Trace window.

In some embodiments, a method of setting the upstream data flow input port for each measurement window includes:
   setting a data reception callback function for each measurement window;
   when the data reception callback function is called, reading, by the measurement window, data flowing out of the upper-layer measurement window from parameters of the callback function.

The method of setting the upstream data flow input port for each measurement window will be described below with a case.

For example, in a window base type of the vehicle CAN bus tool software written by using C language, the data reception callback function is set as follows:
   void on_rx_frame (const ACAN: PCAN);

The data reception callback function has one parameter ACAN which is a pointer of the CAN packet of PCAN type. When the data reception callback function is called by the vehicle bus tool system, the system assigns the pointer of the latest CAN packet received currently to the parameter ACAN of the function, and hence the measurement window can read the contents of the CAN packet from the parameters of the data reception callback function.

Since the data reception callback function is present as a base type of all of the window types, it means that each measurement window supports the call of the data reception callback function. As a result, when data flows from an upper-layer measurement window into a lower-layer measurement window, the data reception callback function of the lower-layer measurement window will be called and the lower-layer measurement window can obtain the contents of the CAN packets flowing out of the upper-layer measurement window.

In some embodiments, a method of setting the downstream data flow output port for each measurement window includes:
   setting a data distribution callback function list and a data distribution program for each measurement window;
   wherein the data distribution callback function list includes: the data reception callback functions of all lower-layer measurement windows connected to a current measurement window;
   when the data flows out of the current measurement window, calling, by the data distribution program, one by one, the data reception callback functions in the data distribution callback function list.

The method of setting the downstream data flow output port for each measurement window will be detailed below with a case.

For example, in a window base type of the vehicle CAN bus tool software written by using C language, the data reception callback function is set as follows:
   bool rx_frame (const ACAN: PCAN);

The data distribution callback function list "dispatch_list" is set, which is an array with elements therein including the pointers of the data reception callback functions of all lower-layer measurement windows connected to the current measurement window.

A data distribution callback function is set as follows:
   void dispatch_frame (const ACAN: PCAN);

Each of the data reception callback function and the data distribution callback function has one parameter ACAN which is a pointer of the CAN packet of PCAN type. When the data reception callback function and the data distribution callback function are called by the vehicle bus tool system, the system assigns the pointer of the latest CAN packet currently received to the parameters of the data reception callback function and the data distribution callback function. Therefore, the measurement window can read the contents of the CAN packets from the parameters of the data reception callback function and the data distribution callback function.

The data reception callback function is a function with a return value, where the return value represents whether the parameter data passes through the filter of the measurement window itself.

In the codes of the data distribution callback function, the current measurement window firstly calls the data reception callback function of the measurement window itself to trigger filtering processing of the current measurement window for data. In the filtering processing procedure, if the data passes through the filter of the current measurement window, the data reception callback function returns true and otherwise returns false. If the data reception callback function returns true, the current measurement window then traverses the data distribution callback function list to call each data reception callback function in the data distribution callback function list and distribute the read contents of the CAN packets to the lower-layer measurement windows. The codes of the data distribution program are as follows:

void dispatch_frame (const ACAN: PCAN)

```
{
   int i;
   if (rx_frame(ACAN)){
      for (i=0; i<dispatch_list_count; i++){
         dispatch_list[i](ACAN);
      }
   }
}
```

Since the data reception callback function and the data distribution callback function are present as a base type of all of the window types, it means that each measurement window supports the call of the data reception callback function and the data distribution callback function. As a result, when data flows from a current measurement window into a lower-layer measurement window, the current measurement window distributes the data to all lower-layer measurement windows connected to the current measurement window. During the distribution, the data distribution callback function will be called. The current measurement window firstly calls its own data reception callback function in the functions to distribute the data flowing out of the current measurement window to each lower-layer measurement window defined in the data distribution callback function list, that is, each of the relevant lower-layer measurement windows can obtain the data of the CAN packets flowing out of the current measurement window.

In some embodiments, a method of setting the filtering function for each measurement window includes:
  extracting a configuration content of the measurement window to form a filtering entry;
  setting a comparison program;
  when the data flows into the measurement window, firstly comparing, by the comparison program, the inflowing data with the filtering entry piece by piece, and allowing the successfully-matched data to flow out of the measurement window.

For example, in a graphical window of a vehicle CAN bus tool software, filtering is performed for the lower-layer measurement window of the graphical window. With the above case, the method of setting the filtering function for the measurement window is detailed as below.

All signals and channel numbers corresponding to the signals and packet Ids in the graphical window are extracted firstly to form the correspondence list below:

| Signal name | Channel number | Packet Id |
|---|---|---|
| EngSpeed | 1 | 0x64 |
| VehicleSpeed | 1 | 0x300 |
| EngTemp | 1 | 0x64 |
| Gear | 2 | 0x70 |

Next, based on the above correspondence list, the information of the same packet Ids is culled to form a channel-Id correspondence list below. The entry contents in the channel-Id correspondence list are the filtering entry.

| Channel number | Packet Id |
|---|---|
| 1 | 0x64 |
| 1 | 0x300 |
| 2 | 0x70 |

When the graphical window receives a CAN packet from an upper-layer measurement window, the comparison program firstly extracts the channel number and the packet Id of the CAN packet and compares them with the entry contents in the channel-Id correspondence list. Only when the channel number and the packet Id of the packet are same as the channel number and the packet Id in the correspondence list can the CAN packet be allowed to pass through the filter of the graphical window and transferred to the lower-layer measurement window. For example, the 0x33 packet from the channel 3 has no corresponding entry in the correspondence list and thus it cannot pass through the filter of the graphical window; but, the 0x300 packet from the channel 1 has a corresponding entry in the second row of the correspondence list and thus it can pass through the filter of the graphical window.

In some embodiments, when any layer of measurement window is deleted, the lower-layer measurement window connected to this layer of measurement window is moved to a layer level where the deleted measurement window is located.

Figure 9:
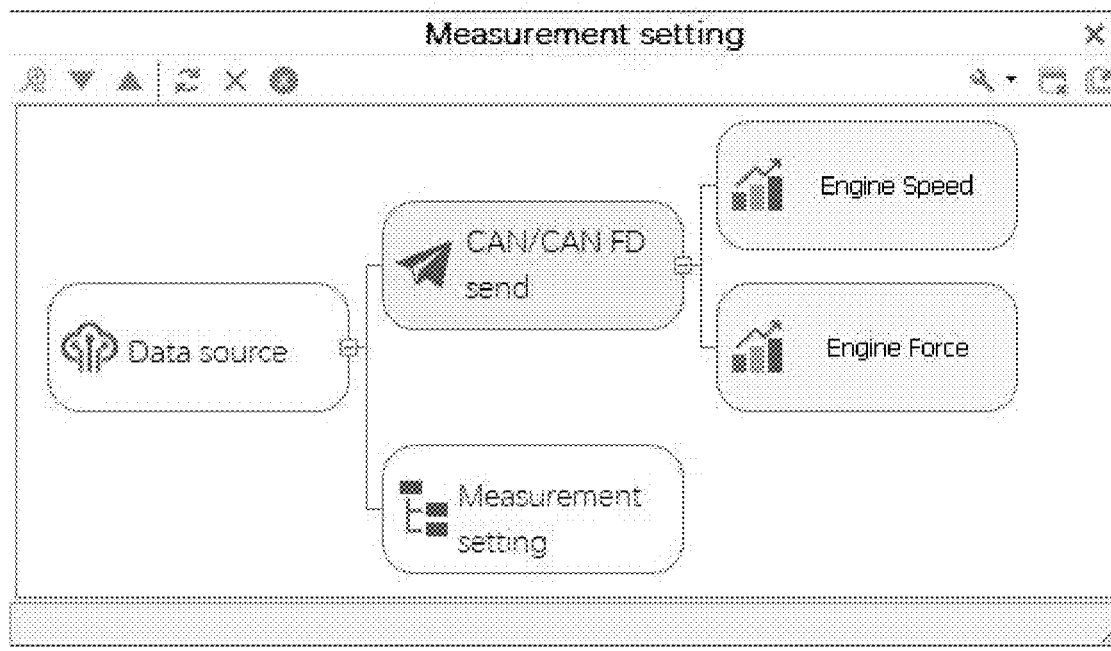
FIG. 9 is a schematic diagram illustrating a case of deleting a measurement window according to some embodiments of the present disclosure.
Figure 10:
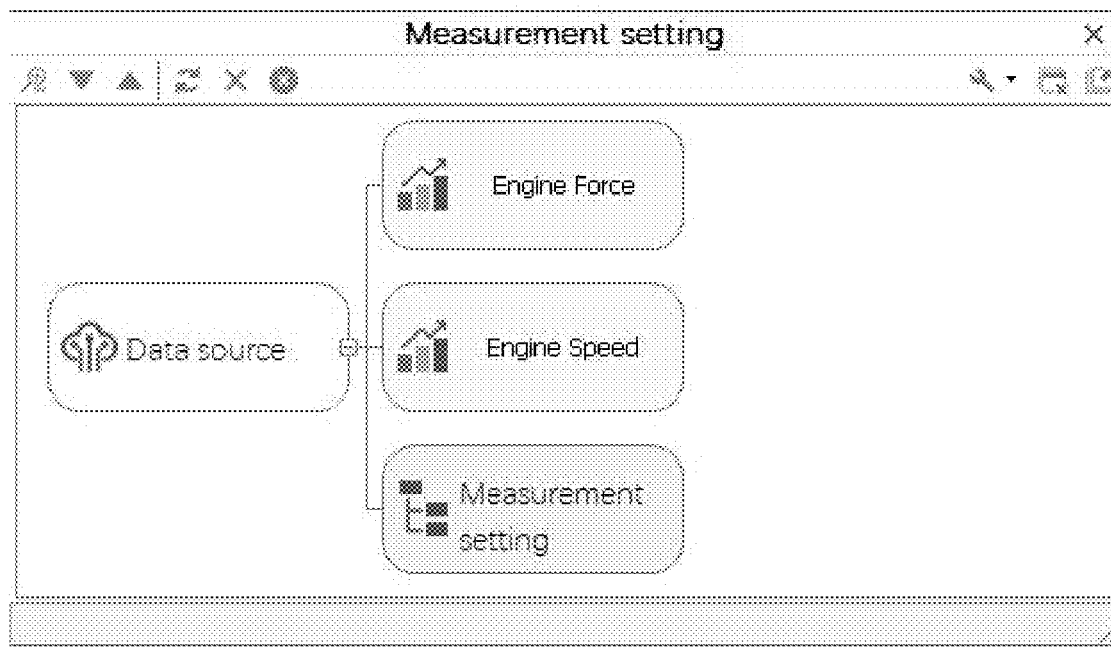
FIG. 10 is a schematic diagram illustrating a case of deleting a measurement window according to some embodiments of the present disclosure.

As shown in FIG. 9, when the measurement window "CAN/CAN FD sending" is deleted, the lower-layer measurement windows "Engine Speed" and "Engine Force" connected to the measurement window are moved to the layer level where the measurement window is located as shown in FIG. 10.

In some embodiments, when the measurement data filter is reset, each measurement window will be reset to directly connect with the data source.

Figure 11:
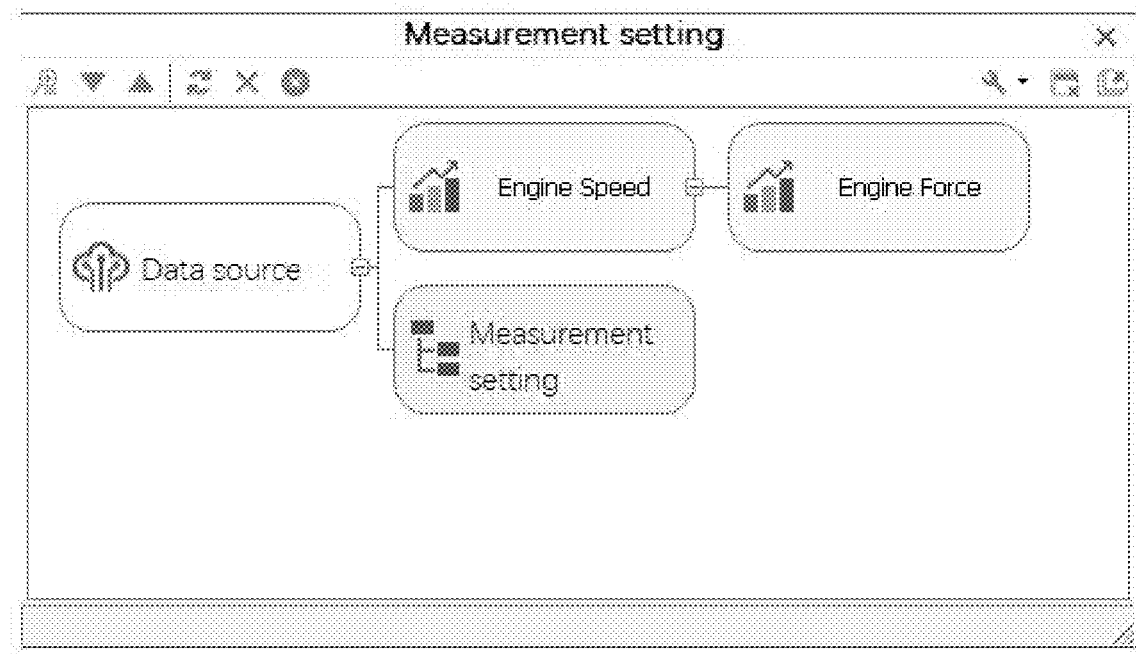
FIG. 11 is a schematic diagram illustrating a case of resetting a measurement data filter according to some embodiments of the present disclosure.
Figure 12:
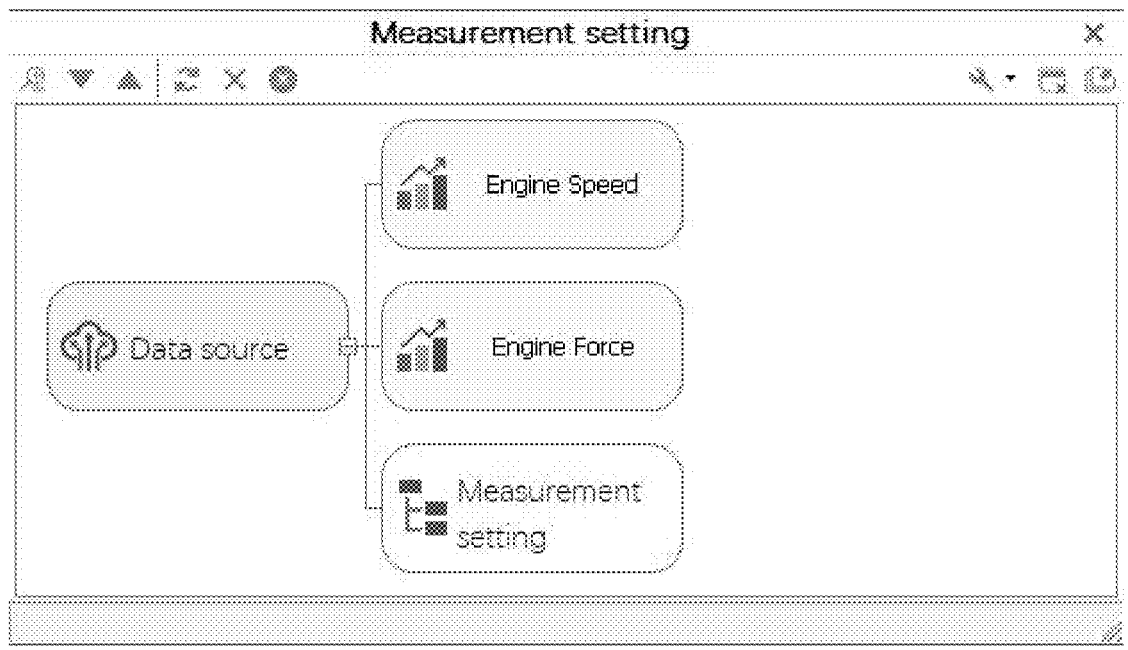
FIG. 12 is a schematic diagram illustrating a case of resetting a measurement data filter according to some embodiments of the present disclosure.

Specifically, the change of the measurement data filter before and after resetting is displayed with a case. As shown in FIG. 11, before the measurement data filter is reset, each measurement window is set as hierarchical connection. By clicking on the reset icon "  " FIG. 11, the measurement data filter can be reset as shown in FIG. 12, and each measurement window is reset to directly connect with the data source.

Figure 13:
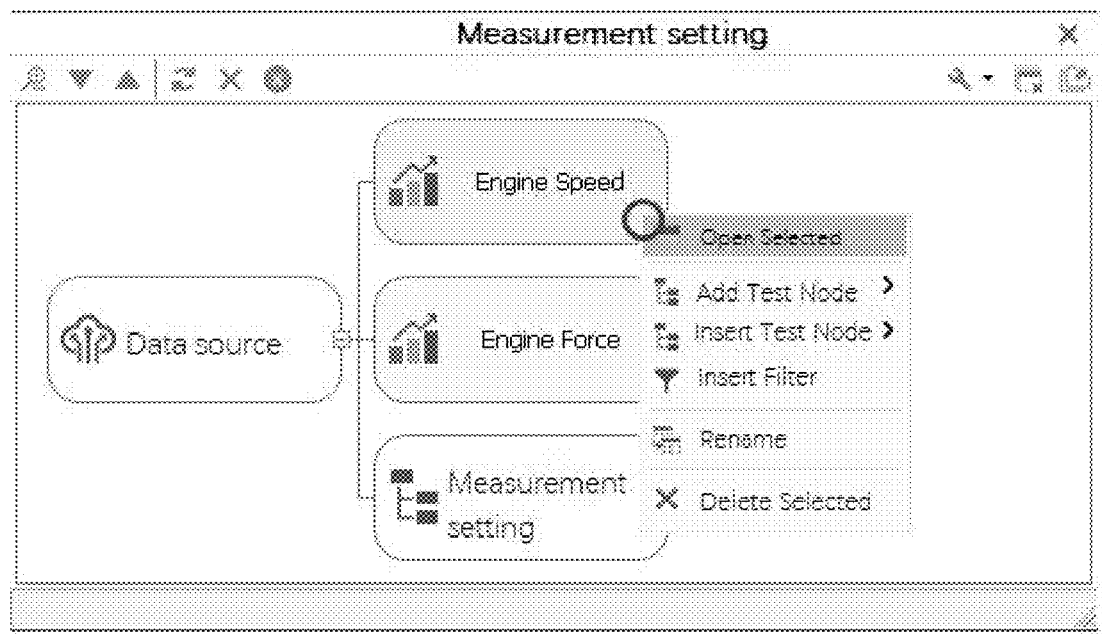
FIG. 13 is a schematic diagram illustrating a case of displaying a configuration content of a measurement window according to some embodiments of the present disclosure.

One or more embodiments further provide a data filtering method, which includes:
  as shown in FIG. 13, by using a measurement setting display interface, displaying a data source window and at least one measurement window connected to the data source, and connecting an upstream data flow input port of each measurement window to a downstream data flow output port of one measurement window other than the measurement window or a data source to form a hierarchical connection; and,
  receiving, by each layer of measurement window, data from an upper-layer measurement window via the upstream data flow input port of this layer of measurement window and filtering the received data and then transporting the data to a lower-layer measurement window via the downstream data flow output port of this layer of measurement window.

The data filtering method further includes:
  by performing trigger on an instruction trigger area in each measurement window, displaying a configuration content of the corresponding measurement window.

Figure 14:
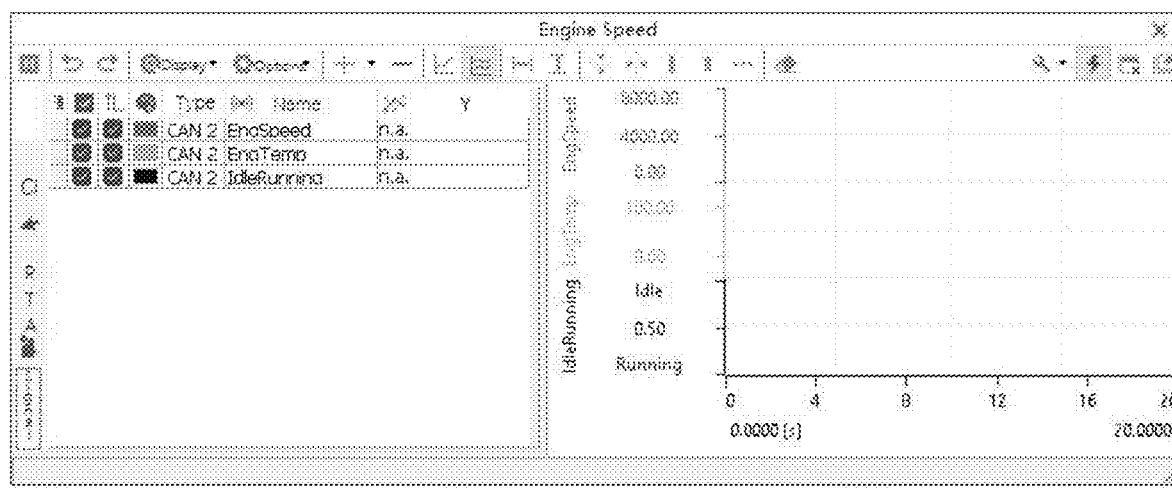
FIG. 14 is a schematic diagram illustrating a case of displaying a configuration content of a measurement window according to some embodiments of the present disclosure.

Specifically, as shown in FIG. 13, the measurement window is right-clicked to trigger the instruction trigger area, and then "open the selected" is clicked to display the configuration content of the measurement window as shown in FIG. 14.

When any measurement window moves, the measurement window forms automatic connection with the corresponding upstream data flow input port and downstream data flow output port of other measurement windows;

after triggering a delete icon "  " in a tool bar in a display interface of the measurement data filter, the selected measurement window is deleted and a lower-layer measurement window of the deleted measurement window is moved to a layer level where the deleted measurement window is located;

by triggering a reset icon "  " in the tool bar in the display interface of the measurement data filter, each measurement window is reset to directly connect with the data source;

by triggering an unfold icon "  " in the tool bar in the display interface of the measurement data filter, all measurement windows are unfolded and displayed;

by triggering a fold icon "  " in the tool bar in the display interface of the measurement data filter, all measurement windows are folded and hidden; and, by triggering a connect icon "  " between upper-layer measurement window and lower-layer measurement window, the lower-layer measurement window is unfolded and displayed or folded and hidden.

Figure 15:
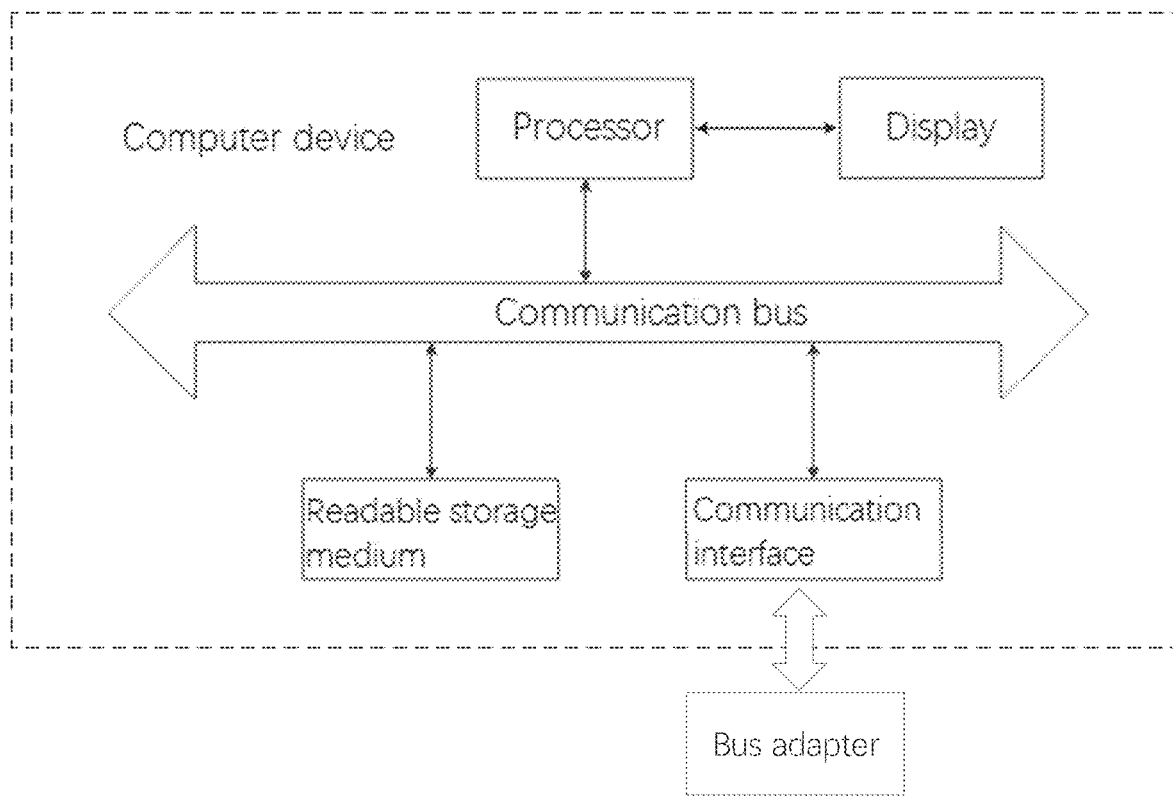
FIG. 15 is a principle block diagram illustrating a system for filtering measurement data according to some embodiments of the present disclosure.

As shown in FIG. 15, one or more embodiments further provide a system for filtering measurement data, including:

at least one bus adapter, configured to obtain a data source from an Electronic Control Unit (ECU);

at least one computer device, including a processor, a display communicating with the processor to present a graphical interface, a readable storage medium, a communication bus and a communication interface; wherein, the processor, the readable storage medium and the communication interface communicate with the bus adapter via the communication bus;

the readable storage medium is configured to store instruction programs;

the processor is configured to, after obtaining the data source, execute the instructions to perform the operations of: setting an upstream data flow input port, a downstream data flow output port and a filtering function for each measurement window; connecting the upstream data flow input port of each measurement window to the downstream data flow output port of one measurement window other than the measurement window or a data source to form a hierarchical connection; receiving, by each layer of measurement window, data from an upper-layer measurement window via the upstream data flow input port of this layer of measurement window and filtering the received data and then transporting the data to a lower-layer measurement window via the downstream data flow output port of this layer of measurement window;

the display displays, through a graphical interface, a data source window and at least one measurement window connected with the data source window.

One or more embodiments of the present disclosure further provide a data filtering method of a measurement system, including:

obtaining a data source from an Electronic Control Unit (ECU) via a bus adapter;

after obtaining the data source, setting an upstream data flow input port, a downstream data flow output port and a filtering function for each measurement window;

connecting the upstream data flow input port of each measurement window to the downstream data flow output port of one measurement window other than the measurement window or a data source to form a hierarchical connection; receiving, by each layer of measurement window, data from an upper-layer measurement window via the upstream data flow input port of this layer of measurement window and filtering the received data and then transporting the data to a lower-layer measurement window via the downstream data flow output port of this layer of measurement window; displaying, by a graphical interface, a data source window and at least one measurement window connected with the data source window.

The method of implementing the measurement data filter involved in the system for filtering measurement data and the filtering method of the measurement system can be referred to the above detailed descriptions and will not be repeated herein.

Figure 16:
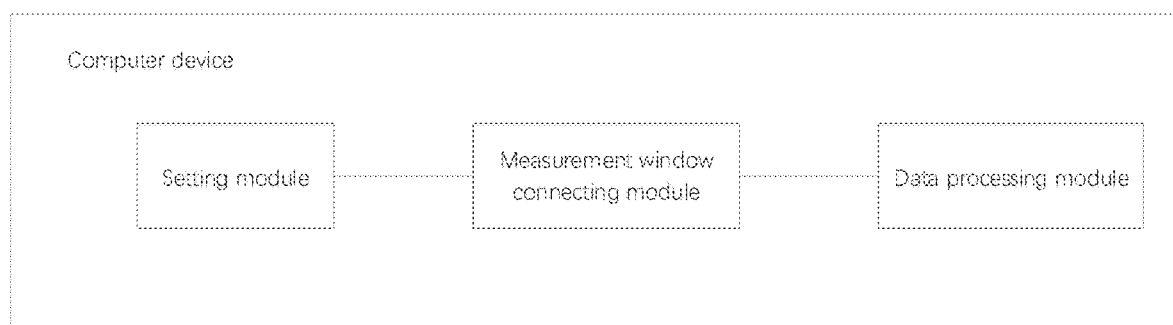
FIG. 16 is a principle block diagram illustrating a system for filtering measurement data according to some embodiments of the present disclosure.

As shown in FIG. 16, one or more embodiments of the present disclosure further provide a system for filtering measurement data, which includes a setting module, a measurement window connecting module and a data processing module, wherein, the setting module is configured to set an upstream data flow input port, a downstream data flow output port and a filtering function for each measurement window;

the measurement window connecting module is configured to connect the upstream data flow input port of each measurement window to the downstream data flow output port of one measurement window other than the measurement window or a data source to form a hierarchical connection;

the data processing module is configured to receive, by each layer of measurement window, data from an upper-layer measurement window via the upstream data flow input port of this layer of measurement window and filter the received data and then transport the data to a lower-layer measurement window via the downstream data flow output port of this layer of measurement window.

Computer instructions corresponding to the specific implementation functions of the setting module, the measurement window connecting module and the data processing module are stored in a computer readable storage medium and can be implemented in a computer device with reference to the contents of the above method of implementing a measurement data filter and thus no redundant descriptions are made herein.

An electronic device in the embodiments of the present disclosure will be described below from the angle of hardware processing.

The specific implementations of some embodiments do not constitute any limitation to the specific implementation of the electronic device.

As shown in FIG. 16, the present electronic device includes a processor, a readable storage medium (also called memory), a communication bus and a communication interface, where the processor, the readable storage medium and the communication interface communicate with each other via the communication bus; the readable storage medium is configured to store programs of performing the method of implementing the measurement data filter. The programs are executed by the processor to perform the operations corresponding to the method of implementing the measurement data filter, where the method includes: setting an upstream data flow input port, a downstream data flow output port and a filtering function for each measurement window; connecting the upstream data flow input port of each measurement window to the downstream data flow output port of one measurement window other than the measurement window or a data source to form a hierarchical connection; receiving, by each layer of measurement window, data from an upper-layer measurement window via the upstream data flow input port of this layer of measurement window and filtering the received data and then transporting the data to a lower-layer measurement window via the downstream data flow output port of this layer of measurement window.

Reference can be made to the detailed descriptions of the method of implementing the measurement data filter and no redundant descriptions are made herein.

In other embodiments, the computer device, and the personal industrial computer may also be used as one of the electronic device.

Figure 17:
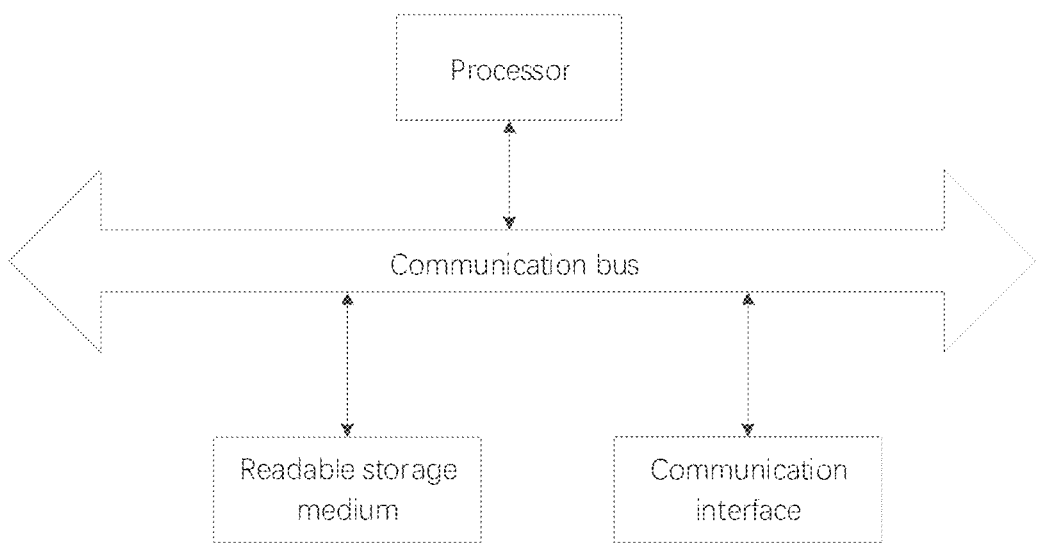
FIG. 17 is a principle block diagram illustrating an electronic device according to some embodiments of the present disclosure.

As shown in FIG. 17, the specific implementation of the electronic device is not limited in some embodiments of the present disclosure.

In some embodiments, the communication interface may be RS232, RS485, USB interface or TYPE interface or the like, which may be connected with an external bus adapter. The communication interface may also include wired or wireless network interface. The network interface may optionally include wired interface and/or wireless interface (such as WI-FI interface, Bluetooth interface and the like), which is usually used to establish communication connection between the server and other computer devices.

Optionally, the computer device may also include a user interface, which may include a display, and an input unit, for example, a keyboard. Optionally, the user interface may also include a standard wired interface and wireless interface. Optionally, in some embodiments, the display may be an LED display, a liquid crystal display, a touch liquid crystal display and an Organic Light-Emitting Diode (OLED) touch display and the like. The display may also be appropriately referred to as display screen or display unit for displaying information processed in the computer device as well as a visual user interface.

The readable storage medium or the computer readable storage medium includes at least one type of memories. The memory includes flash memory, harddisk drive, multimedia card, card type memory (e.g. SD memory or the like), magnetic memory, magnetic disk or compact disk or the like. In some embodiments, the memory may be an internal storage unit in the computer device, for example, a harddisk drive of the computer device. In some other embodiments, the memory may also be an external storage device of the computer device, for example, a plug type hard disk drive, a smart media card (SMC), a secure digital (SD) card, a flash card or the like on the computer device. Furthermore, the memory may include both the internal storage unit in the computer device and the external storage device. The memory may be used to not only store an application software installed on the computer device and various types of data, for example, the codes of the computer programs and the like but also temporarily store data already output or to be output.

In some embodiments, the processor may be a central processing unit (CPU), a processor, a controller, a microcontroller, a microprocessor or another data processing chip, which is used to run the program codes in the memory or process the data, for example, execute the computer programs or the like.

In some embodiments, the communication bus may also be an input/output bus, which may be a Peripheral Component Interconnect (PCI) bus, or an Enhanced Industry Standard Architecture (EISA) bus or the like. The bus may include an address bus, a data bus and a control bus and the like.

The processor executes the programs to perform the steps in the method of implementing the measurement data filter shown in FIG. 1, for example, steps S101 to S103 shown in FIG. 1. Alternatively, the processor executes the computer programs to implement the functions of the modules or units in the above apparatus embodiments.

One or more embodiments further provide a computer readable storage medium configured to store programs of performing any one of the above methods of implementing the measurement data filter.

One or more embodiments further provide a computer readable storage medium, storing computer readable instructions. The computer readable instructions are executed by at least one processor to perform the above method of implementing the measurement data filter, which specifically includes: setting an upstream data flow input port, a downstream data flow output port and a filtering function for each measurement window; connecting the upstream data flow input port of each measurement window to the downstream data flow output port of one measurement window other than the measurement window or a data source to form a hierarchical connection; receiving, by each layer of measurement window, data from an upper-layer measurement window via the upstream data flow input port of this layer of measurement window and filtering the received data and then transporting the data to a lower-layer measurement window via the downstream data flow output port of this layer of measurement window. Reference can be made to the detailed descriptions of the method of implementing the measurement data filter and no redundant descriptions are made herein.

One or more embodiments further provide a computer program product, including computer programs or instructions, where the computer programs or instructions are executed on a computer to cause the computer to perform any one of the above methods of implementing the measurement data filter.

One or more embodiments further provide a computer program product, including a computer readable storage medium storing computer readable program codes, where the computer readable program codes include instructions which cause at least one processor or one or more computer devices to perform the operations of:

setting an upstream data flow input port, a downstream data flow output port and a filtering function for each measurement window; connecting the upstream data flow input port of each measurement window to the downstream data flow output port of one measurement window other than the measurement window or a data source to form a hierarchical connection; receiving, by each layer of measurement window, data from an upper-layer measurement window via the upstream data flow input port of this layer of measurement window and filtering the received data and then transporting the data to a lower-layer measurement window via the downstream data flow output port of this layer of measurement window.

Reference can be made to the detailed descriptions of the method of implementing the measurement data filter and no redundant descriptions are made herein.

Figure 18:
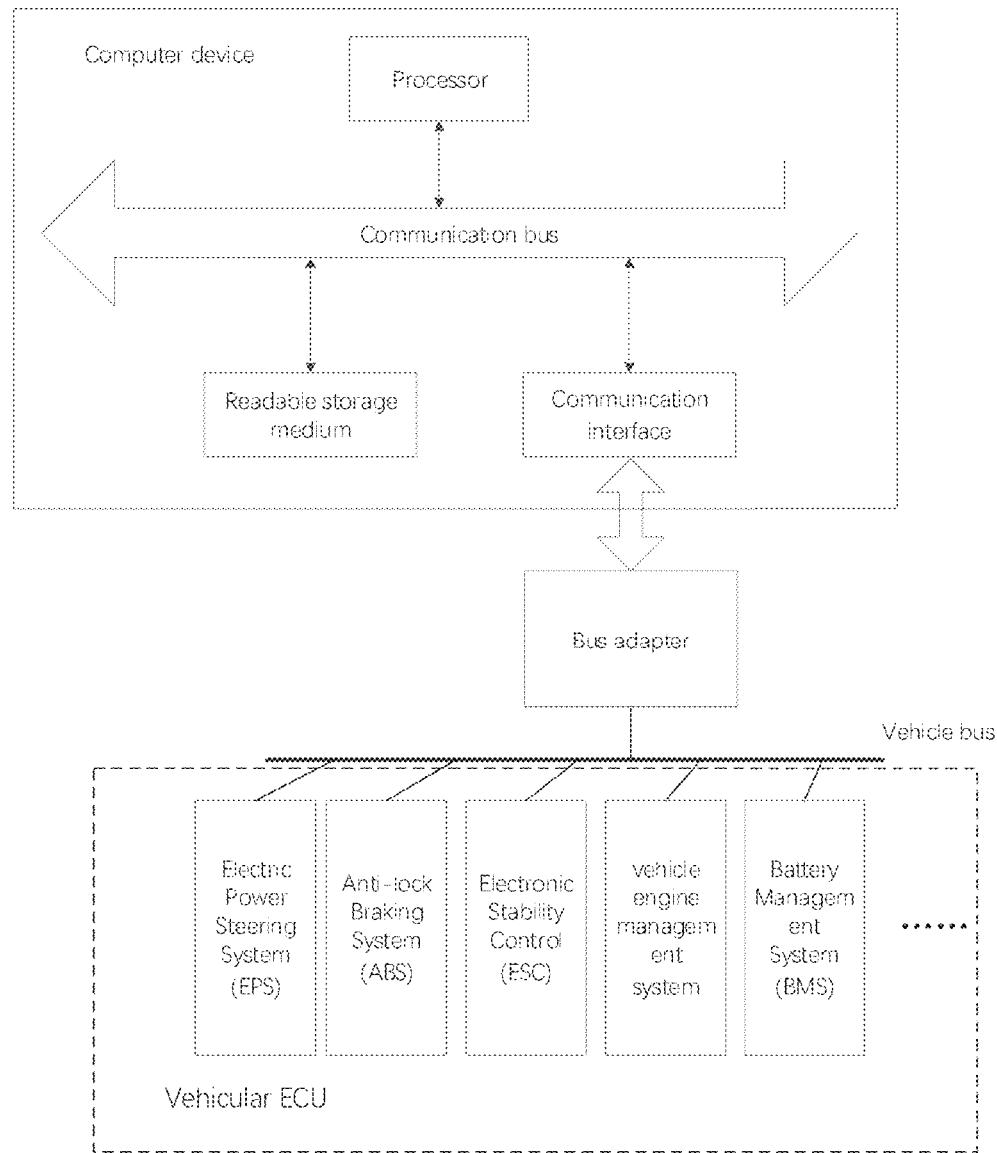
FIG. 18 is a principle block diagram illustrating a system for filtering measurement data according to some embodiments of the present disclosure.

As shown in FIG. 18, one or more embodiments further provide a system for filtering measurement data, including a computer device and a bus adapter, where, the computer device includes a processor, a readable storage medium, a communication bus and a communication interface, where, the readable storage medium is configured to store programs of performing the method of implementing the measurement data filter, and the processor is configured to execute the programs of performing the above method of implementing the measurement data filter;

the processor, the readable storage medium and the communication interface communicate with the bus adapter via the communication bus to obtain a data source from the ECU.

In some embodiments, the bus adapter may be a Controller Area Network (CAN) bus adapter, a Controller Area Network Flexible Data Rate (CANFD) bus adapter, a Fast Local Interconnect Network (FastLIN) bus adapter, a Local Interconnect Network (LIN) bus adapter, an Ethernet bus adapter or a FlexRay bus adapter, and also may be one-to-multiple or multiple-to-multiple. In some other embodiments, no limitation is made to the specific implementation of the bus adapter. In some embodiments, the corresponding data source may be obtained by communicating with a debugging device based on Unified Diagnostic Services (UDS), or Universal Measurement and Calibration Protocol (XCP) or CAN Calibration Protocol (CCP). In some embodiments, a data source may also be obtained from the ECU by communicating with a debugging device, for example, the vehicle Electronic Control Unit (ECU) and its relevant system based on UDS, or XCP or CCP.

In some embodiments, the debugging device in the vehicle field may be a vehicle ECU or its relevant system, which includes but not limited to: Electric Power Steering System (EPS), Anti-lock Baking System (ABS), Electronic Stability Control (ESC), vehicle engine management system and Battery Management System (BMS) and the like which can be connected to the computer device via a bus to receive the data source.

In some embodiments, the method of implementing the measurement data filter, the system for filtering measurement data, the filtering method of the measurement system and the data filtering method can be applied to obtaining the data source from the ECU in the vehicle bus tool software.

In the several embodiments provided by the present disclosure, it should be understood that the disclosed device and method can be implemented another way. The above device embodiments are merely illustrative, for example, the flowcharts or block diagrams in the drawings show possible system architectures, functions and operations of the device, method, and computer program product in the several embodiments provided by the present disclosure. Thus, each block in the flowcharts or block diagrams may represent one module, one program fragment or one part of codes. The module, the program fragment or the part of codes includes one or more executable instructions for implementing the specified logic functions. It should be noted that in some alternative embodiments, the functions indicated in the blocks may also be performed in a sequence different from that indicated in the drawings. For example, two continuous blocks can be actually performed basically in parallel, and sometimes may be performed in a reverse sequence, which is dependent on the functions involved. It is further noted that each block in the block diagrams and/or flowcharts and the combinations of the blocks in the block diagrams and/or flowcharts may be implemented by a dedicated hardware-based system for executing specified functions or actions, or by combination of dedicated hardware and computer instructions.

Furthermore, the functional modules in the embodiments of the present disclosure can be integrated into one independent part, or exist as separate modules or two or more of the modules are integrated into one independent part.

The functions, when implemented by software function modules and sold or used as independent products, can be stored in one computer readable storage medium. Based on such understanding, the essence of technical solutions of the present disclosure, or a part contributing to the prior arts or a part of the technical solutions can be embodied in the form of software product. The computer software product is stored in one storage medium which includes several instructions to enable one computer device (for example, a personal computer, a server, or a network device or the like) to perform all or part of the steps of the method of each of the embodiments of the present disclosure.

Enlightened by the ideal embodiments of the present disclosure, relevant workers can, based on the contents of the specification, make various changes and modifications within the scope of protection of the technical idea of the present disclosure. The technical scope of the present disclosure is not limited to the contents of the specification but to the technical scope claimed by the claims.

What is claimed is:

1. A system for filtering measurement data, comprising:
at least one bus adapter configured to obtain a data source from an Electronic Control Unit (ECU) of a vehicle; and
at least one computer device comprising a processor, a display communicating with the processor to present a graphical interface, a non-transitory computer-readable storage medium, a communication bus, and a communication interface; wherein:
the processor, the non-transitory computer-readable storage medium, and the communication interface communicate with the at least one bus adapter via the communication bus;
the non-transitory computer-readable storage medium is configured to store instruction programs;
the processor is configured to, after obtaining the data source from the ECU of the vehicle, execute the instruction programs to perform the operations of: setting an upstream data flow input port, a downstream data flow output port, and a filtering function for each measurement window executing in a vehicle bus tool software; connecting the upstream data flow input port of each measurement window to the downstream data flow output port of one measurement window other than the measurement window or a data source to form a dynamic hierarchical connection in the graphical interface; and receiving, by each layer of a measurement window, data from an upper-layer measurement window via the upstream data flow input port of the layer of the measurement window and filtering, by the filtering function, the received data and then transporting the filtered data to a lower-layer measurement window via the downstream data flow output port of the layer of the measurement window; and
the display displays, through the graphical interface, a data source window and/or at least one measurement window connected with the data source window.

2. The system according to claim 1, wherein:
each measurement window is in a dynamic hierarchical connection with other measurement windows, and capable of adjusting a connection relationship with other measurement windows or data source.

3. The system according to claim 2, wherein:
the setting of the upstream data flow input port for each measurement window comprises:
setting a data reception callback function for each measurement window; and
when the data reception callback function is called, reading, by the measurement window, data flowing out of the upper-layer measurement window from parameters of the data reception callback function.

4. The system according to claim 2, wherein:
the setting of the downstream data flow output port for each measurement window comprises:
setting a data distribution callback function list and a data distribution program for each measurement window;
wherein the data distribution callback function list comprises: data reception callback functions of all lower-layer measurement windows connected to a current measurement window; and
when data flows out of the current measurement window, calling, by the data distribution program, one by one, the data reception callback functions in the data distribution callback function list.

5. The system according to claim 2, wherein:
the setting of the filtering function for each measurement window comprises:
extracting a configuration content of the measurement window to form a filtering entry;
setting a comparison program; and
when data flows into the measurement window, firstly comparing, by the comparison program, inflowing data with the filtering entry piece by piece, and allowing successfully-matched data to flow out of the measurement window.

6. The system according to claim 2, wherein:
when any layer of the measurement window is deleted, the lower-layer measurement window connected to the deleted layer of the measurement window is moved to a layer level where the deleted layer of the measurement window is located.

7. The system according to claim 2, wherein:
when a measurement data filter is reset, each measurement window is reset to directly connect with the data source.

8. The system according to claim 1, wherein:
the at least one bus adapter is a CAN bus adapter, a CANFD bus adapter, a FastLIN bus adapter, a LIN bus adapter, an Ethernet bus adapter, or a FlexRay bus adapter; and
based on Unified Diagnostic Services (UDS), Universal Measurement and Calibration Protocol (XCP), or CAN Calibration Protocol (CCP), communication is performed with the ECU of the vehicle to obtain a data source from a debugging device.

9. The system according to claim 8, wherein:
the debugging device comprises Electric Power Steering System (EPS), Anti-lock Braking System (ABS), Electronic Stability Control (ESC), vehicle engine management system, and Battery Management System (BMS).

10. A data filtering method of a measurement system, comprising:
obtaining a data source from an Electronic Control Unit (ECU) of a vehicle via at least one bus adapter;
after obtaining the data source from the ECU of the vehicle, setting an upstream data flow input port, a downstream data flow output port, and a filtering function for each measurement window executing in a vehicle bus tool software;
connecting the upstream data flow input port of each measurement window to the downstream data flow output port of one measurement window other than the measurement window or a data source to form a dynamic hierarchical connection in a graphical interface;
receiving, by each layer of a measurement window, data from an upper-layer measurement window via the upstream data flow input port of the layer of the measurement window and filtering, by the filtering function, the received data and then transporting the filtered data to a lower-layer measurement window via the downstream data flow output port of the layer of the measurement window; and
displaying, by the graphical interface, a data source window and/or at least one measurement window connected with the data source window.

11. The data filtering method according to claim 10, wherein:
each measurement window is in a dynamic hierarchical connection with other measurement windows, and capable of adjusting a connection relationship with other measurement windows or data source.

12. The data filtering method according to claim 11, wherein:
the setting of the upstream data flow input port for each measurement window comprises:
setting a data reception callback function for each measurement window; and
when the data reception callback function is called, reading, by the measurement window, data flowing out of the upper-layer measurement window from parameters of the data reception callback function.

13. The data filtering method according to claim 11, wherein:
the setting of the downstream data flow output port for each measurement window comprises:
setting a data distribution callback function list and a data distribution program for each measurement window;
wherein the data distribution callback function list comprises: data reception callback functions of all lower-layer measurement windows connected to a current measurement window; and
when data flows out of the current measurement window, calling, by the data distribution program, one by one, the data reception callback functions in the data distribution callback function list.

14. The data filtering method according to claim 11, wherein:
the setting of the filtering function for each measurement window comprises:
extracting a configuration content of the measurement window to form a filtering entry;
setting a comparison program; and
when data flows into the measurement window, firstly comparing, by the comparison program, inflowing data with the filtering entry piece by piece, and allowing successfully-matched data to flow out of the measurement window.

15. The data filtering method according to claim 11, wherein:
when any layer of measurement window is deleted, the lower-layer measurement window connected to the deleted layer of the measurement window is moved to a layer level where the deleted layer of the measurement window is located.

16. The data filtering method according to claim 11, wherein:
when a measurement data filter is reset, each measurement window is reset to directly connect with the data source.

17. The data filtering method according to claim 10, wherein:
the at least one bus adapter is a CAN bus adapter, a CANFD bus adapter, a FastLIN bus adapter, a LIN bus adapter, an Ethernet bus adapter, or a FlexRay bus adapter; and
based on Unified Diagnostic Services (UDS), Universal Measurement and Calibration Protocol (XCP), or CAN Calibration Protocol (CCP), communication is performed with the ECU of the vehicle to obtain a data source from a debugging device.

18. The data filtering method according to claim 17, wherein:
the debugging device comprises Electric Power Steering System (EPS), Anti-lock Braking System (ABS), Electronic Stability Control (ESC), vehicle engine management system, and Battery Management System (BMS).

19. A data filtering method of a measurement system, comprising:
by using a measurement setting display interface, displaying a data source window and/or at least one measurement window executing in a vehicle bus tool software connected with the data source window;
setting an upstream data flow input port, a downstream data flow output port, and a filtering function for each measurement window executing in the vehicle bus tool software;
connecting the upstream data flow input port of each measurement window to the downstream data flow output port of one measurement window other than the measurement window or a data source from an Electronic Control Unit (ECU) of a vehicle to form a dynamic hierarchical connection in the measurement setting display interface; and
receiving, by each layer of a measurement window, data from an upper-layer measurement window via the upstream data flow input port of the layer of the measurement window and filtering, by the filtering function, the received data and then transporting the filtered data to a lower-layer measurement window via the downstream data flow output port of the layer of the measurement window.

20. The data filtering method according to claim 19, further comprising:
by performing a trigger on an instruction trigger area in each measurement window, displaying a configuration content of a corresponding measurement window;
when any measurement window moves, forming, by the measurement window, automatic connection with a corresponding upstream data flow input port and a corresponding downstream data flow output port of other measurement windows;
after triggering a delete icon in a tool bar in a display interface of a measurement data filter, deleting a selected measurement window and moving a lower-layer measurement window of the deleted measurement window to a layer level where the deleted measurement window is located;
by triggering a reset icon in the tool bar in the display interface of the measurement data filter, resetting each measurement window to directly connect with the data source from the ECU of the vehicle;
by triggering an unfold icon in the tool bar in the display interface of the measurement data filter, unfolding to display all measurement windows;
by triggering a fold icon in the tool bar in the display interface of the measurement data filter, folding to hide all measurement windows; and
by triggering a connect icon between an upper-layer measurement window and a lower-layer measurement window, unfolding to display or folding to hide the lower-layer measurement window.

\* \* \* \* \*